United States Patent [19]

Milgram

[11] 4,271,017
[45] Jun. 2, 1981

[54] OIL SEPARATOR

[75] Inventor: Jerome H. Milgram, Cambridge, Mass.

[73] Assignee: Offshore Devices, Inc., Peabody, Mass.

[21] Appl. No.: 25,620

[22] Filed: Mar. 30, 1979

[51] Int. Cl.³ ............................................. E02B 15/04
[52] U.S. Cl. ...................................... 210/95; 210/519; 210/522; 210/923
[58] Field of Search ................. 210/95, 519, 521, 522, 210/540, DIG. 25

[56] References Cited

U.S. PATENT DOCUMENTS

| 290,000 | 12/1883 | Detrick | 210/95 |
|---|---|---|---|
| 554,598 | 2/1896 | Gilmore | 55/176 |
| 2,207,399 | 7/1940 | Gaertner | 210/521 X |
| 2,651,415 | 8/1953 | Worthen et al. | 210/95 X |
| 2,664,963 | 1/1954 | Lovelady et al. | 55/176 X |
| 2,843,270 | 7/1958 | Acosta | 210/540 X |
| 3,184,065 | 5/1965 | Bradford | 210/519 |
| 3,460,677 | 8/1969 | Fifer | 210/521 X |
| 3,508,652 | 4/1970 | Woolley | 210/540 X |
| 3,517,815 | 6/1970 | Bolton et al. | 210/521 X |
| 3,731,802 | 5/1973 | James | 210/540 X |
| 4,060,487 | 11/1977 | Samsel | 210/DIG. 25 |

OTHER PUBLICATIONS

Final Report Evaluating and Testing of Pumps and Separators for the Arctic Marine Oil Spill Program by Western Canada Hydraulic Laboratories Ltd., Port Coquitlam, B. C., pp. 38-44, 53-55, and Tables and Figures, Apr. 1978.

Primary Examiner—John Adee

[57] ABSTRACT

An oil separator for use at the scene of an oil spill, featuring a tank divided by imperforate bulkheads into a folded, horizontal flow path, the flow path being further divided by perforate baffles through which the flow passes, the baffles having apertures selected to pass debris but also provide wave damping and evening of flow velocities.

8 Claims, 7 Drawing Figures

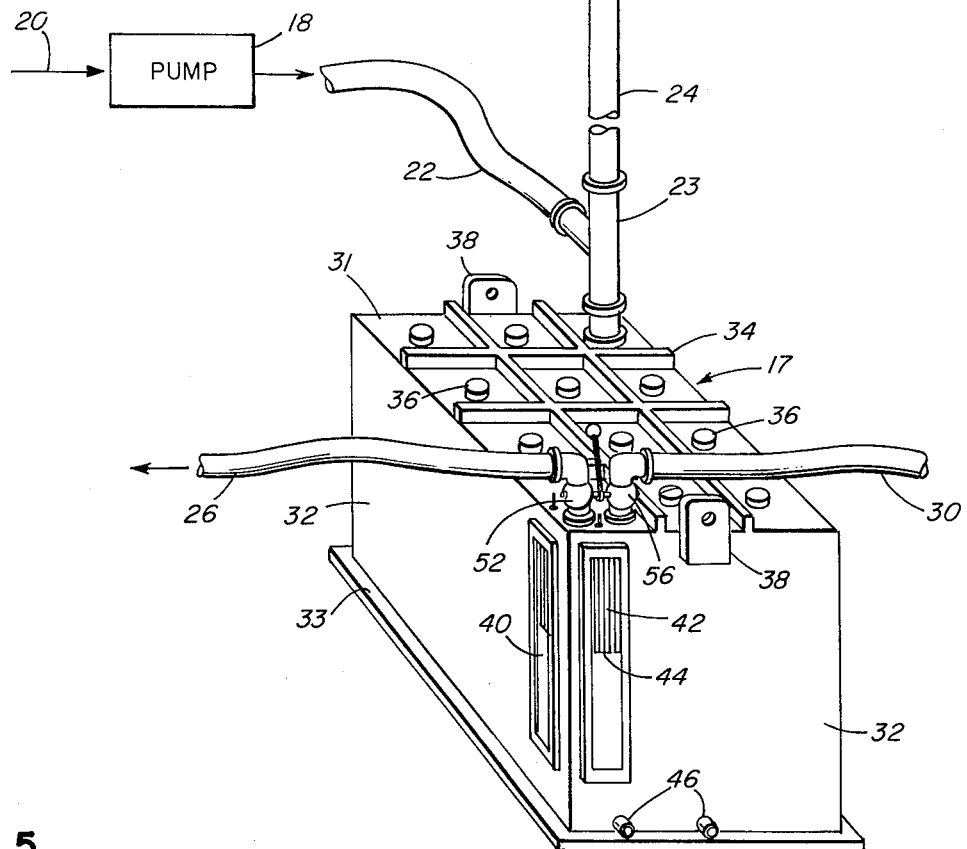
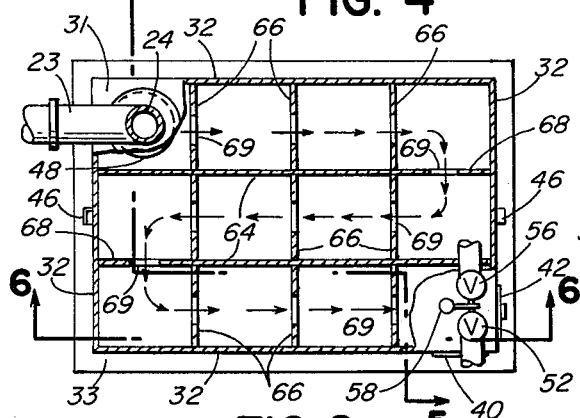
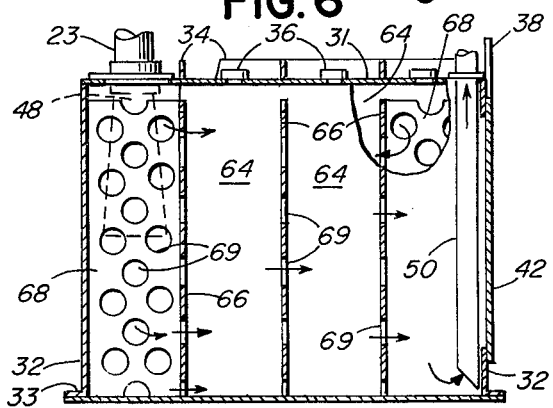
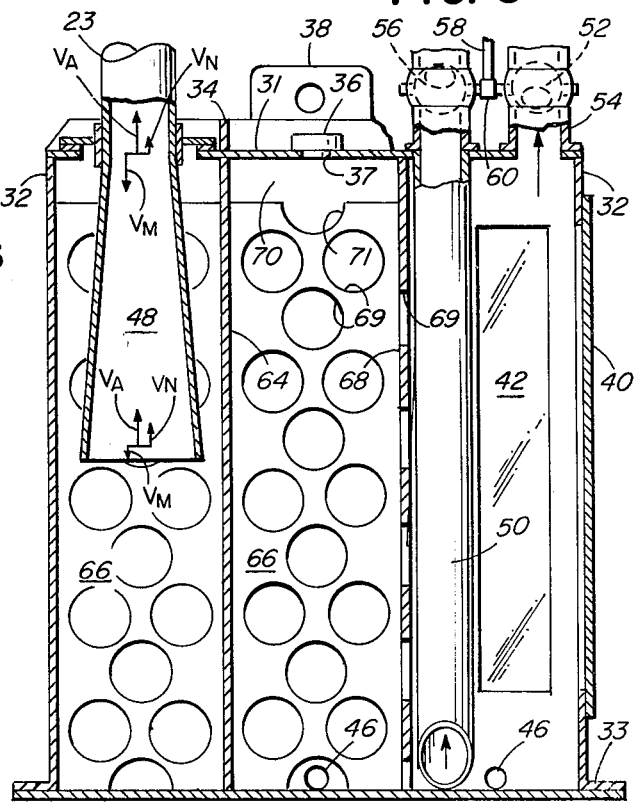

OIL SEPARATOR

FIELD OF THE INVENTION

This invention relates to oil-water separators.

BACKGROUND OF THE INVENTION

In cleaning up oil spills on water, it is often desirable to separate the oil from the water in order to minimize the needed storage capacity for the oil and to facilitate subsequent oil disposal. Further, providing for on-scene separation of water from the oil permits the use of high rate oil skimmers that are less efficient at rejecting water.

A problem common to many oil spills is debris floating in the oil or water. In icy water, the debris may be chunks of ice. A separator must be able to handle debris without becoming clogged.

A further problem in cleaning up oil spills is that clean-up equipment must in most cases be transported on some kind of vehicle, normally a road vehicle or a waterborne vessel. This means that the separator must be portable, meaning it ought to be lightweight and not overly large. Height, particularly, must be controlled because an overly tall separator would raise the center of gravity of a small boat or road vehicle to an unsafe height.

A number of types of oil-water separators are known, e.g., centrifugal, coalescing, and gravity. Separators of the latter, gravity type are inherently simple, as they involve no moving parts, but the large size and weight of the separating tanks required has conventionally limited their use to fixed sites, such as waste water treatment plants. E.g., U.S. Pat. Nos. 1,672,583; 2,820,550; 3,419,145; 3,517,815; 3,933,654; 4,049,553; and 4,132,652. One of these prior waste-water separators, Bolton et al. U.S. Pat. No. 3,517,815, shows a tank divided by vertical plates into a serpentine, horizontal flow path.

SUMMARY OF THE INVENTION

I have found that the advantages of gravity separation, and a relatively high separation efficiency, can be had in a portable separator that can be stably mounted on a vehicle for use at the scene of an oil spill. The separator provides a long enough residence time for gravity to adequately separate oil and water, has a high flow capacity (e.g., 60 gal/min), can handle debris, retards emulsification of oil and water, is immune to entrained air in the incoming oil-water mixture, can accept wide variation in the percentages of oil and water, and above all is simple to build and operate.

In one aspect, the invention features a pressurized separation tank divided by bulkheads into a folded, horizontal flow path and divided along the path into compartments by perforate baffles, the apertures of the baffles being selected to pass entering debris, to even out flow velocities across the flow path, and to damp sloshing wave motion, including interfacial waves at the oil-water interface. Liquid under pressure completely fills the tank during use, thereby eliminating the rocking instability present with certain conventional gravity separators that leave an air-liquid interface and thereby allow liquid movement during rocking to detrimentally shift the center of gravity of the liquid. Furthermore, the bulkheads and baffles limit wave motion during filling and draining of the tank to enhance vehicle stability during those periods as well. A long residence time (e.g., 6 minutes at 60 gal/min) is provided by the folded path and by the action of the perforate baffles in preventing high-velocity paths that could shorten residence time for a fraction of the incoming mixture. The long residence time allows a height reduction to enhance vehicle stability. Oil-water emulsification is kept small by the low and consistent flow speeds and by the action of the perforate baffles in damping interfacial wave motion. In preferred embodiments, the perforate baffles stop short of the top of the tank to provide a gap that allows passage of floating debris; the flow path cross section is more than twice as high as it is wide (preferably 3 to 4 times as high); and the bulkheads give a plurality of folds to the flow path, making it serpentine.

In another aspect, the invention features a standpipe extending upward from said tank to establish a hydrostatic pressure inside the tank. Air entrained in the incoming oil and water mixture can thereby escape and excess pressure inside the tank can be relieved. In preferred embodiments, an inlet chamber is provided through which said incoming mixture is constrained to flow before reaching the interior of the tank, the chamber being aligned below the standpipe and extending downwardly therefrom a substantial distance into the tank. The inlet chamber maintains the incoming mixture aligned below the standpipe for an extended duration to enable buoyancy forces acting upon the entrained air to remove the air through the standpipe before the air reaches the interior of the tank. Removing the air permits use of simple collapsible, floatable oil storage bags that do not require air venting. In preferred embodiments, the inlet chamber increases in flow cross section (e.g., frustroconcial shape) toward its downward end, thereby slowing the velocity of said mixture confined in the chamber to prolong its residence time below the standpipe and thereby enhance removal of said air.

In still another aspect, the invention features a vertically-extending window in the wall of the tank for providing the operator with a visual indication of the heights of separated oil and water in said separator and valve means operable by a single handle for adjusting the relative proportions of oil and water outflowing through said outlets, to allow the relative heights of oil and water to be maintained constant in spite of differences in the relative proportions of oil and water entering the separator. In preferred embodiments, the valve means includes a pair of adjacent ball valves, one valve on the water outlet and one valve on the oil outlet, both valves being connected to a common shaft, whereby rotation of the shaft progressively opens one valve while closing the other.

PREFERRED EMBODIMENT

The structure and operation of a preferred embodiment of the invention will now be described, after first briefly describing the drawings.

FIG. 3 is a perspective view of the exterior of the separator.

FIG. 4 is a plan view of the separator, partially cut away to show its interior.

FIG. 5 is a cross-sectional view at 5—5 of FIG. 4.

FIG. 6 is a cross-sectional view at 6—6 of FIG. 4.

Figure 1:
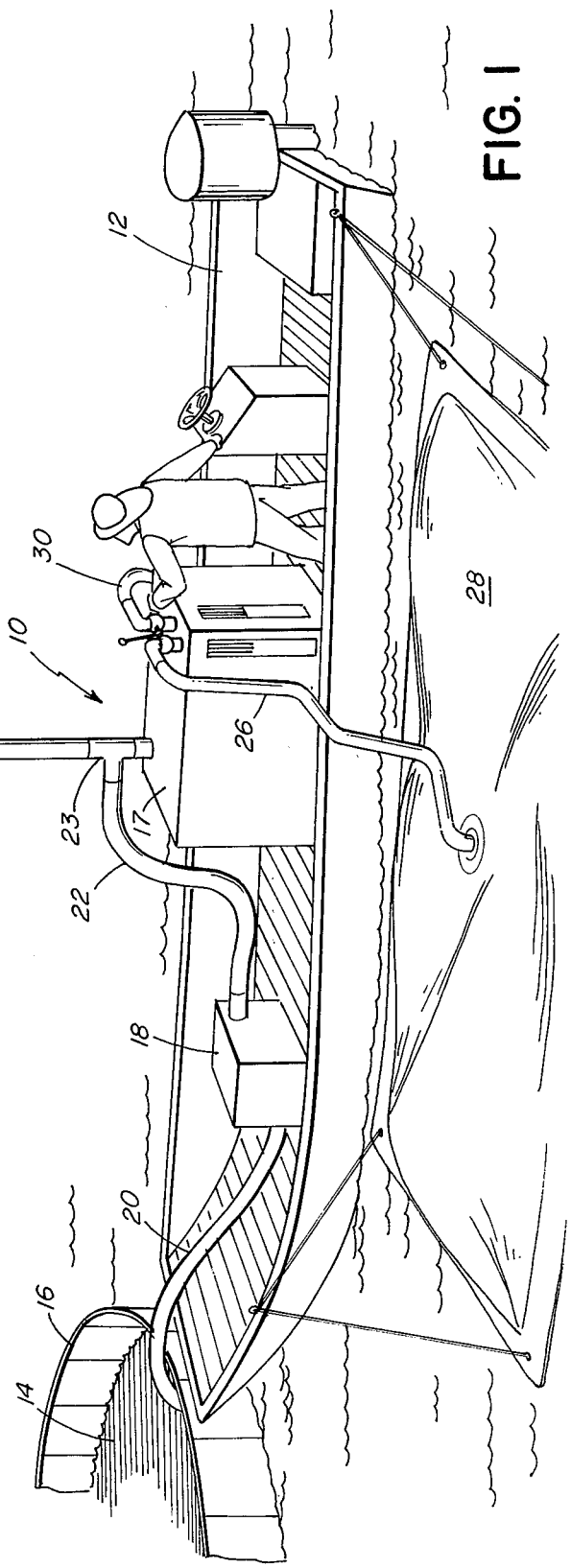
FIG. 1 is a perspective view of a preferred embodiment of the separator, shown installed in a boat and being used in cleaning up an oil spill.

Turning to FIG. 1, there is shown an oil separator 10 installed in an open work boat 12 (26 feet long). An oil spill consisting of a mixture of oil and water at area 14 is contained within skimmer barrier 16, and is pumped into tank 17 of the separator by pump 18 through inlet hoses 20, 22. An oil-water-air mixture enters separator 10 through T-fitting 23 in standpipe 24. Oil exits from the separator through outlet hose 26 into floating oil-storage bag 28. Water exits over the side of boat 12 through outlet hose 30.

Turning to FIG. 3, tank 17 is built from plates of polypropylene, including top 31, sides 32, and bottom 33, welded together. Top plate 31 has a lattice of stiffening ribs 34 and removable caps 36 covering clean-out holes 37 (FIG. 5). Members 38 at either end of the separator provide hoist points for installing the separator onto the work boat or elsewhere. Windows 40, 42 at one corner of the separator admit light and provide a visual indication of the height of the oil-water interface 44, and are constructed of polycarbonate (General Electric's Lexan) bolted to the separator. Drain ports 46 are provided at the base.

Turning to FIG. 5, the oil-water-air mixture enters through downwardly-directed conical element 48, which is aligned beneath standpipe 24 and is about 20 inches long, extending halfway down inside the separator. The conical element opens from a 4 inch diameter at the inlet to about a 9 inch diameter. Separated water flows out of the tank 17 (under the pressure provided by pump 20) through pipe 50 extending from the bottom of the separator tank to ball valve 52. Separated oil flows out through outlet 54 at the top of the tank to ball-valve 56. The ball elements within valves 52, 56 are oriented at 90° from one another, and connected to common shaft 60. Movement of handle 58 on shaft 60 progressively opens one valve while shutting the other.

Turning to FIG. 4, the folded serpentine flow path through the separator is indicated by arrows F. Imperforate bulkheads 64 and sides 32 define the serpentine path. Perforate baffles extend across the flow path at eleven locations to provide flow-evening and wave-damping action. Each perforate baffle 66 includes a series of 4 inch diameter apertures 69 arranged as shown in FIG. 5, and each stops short of top plate 31 so as to provide gap 70 near the top of the tank, to allow floating debris to move along the flow path.

Figure 2:
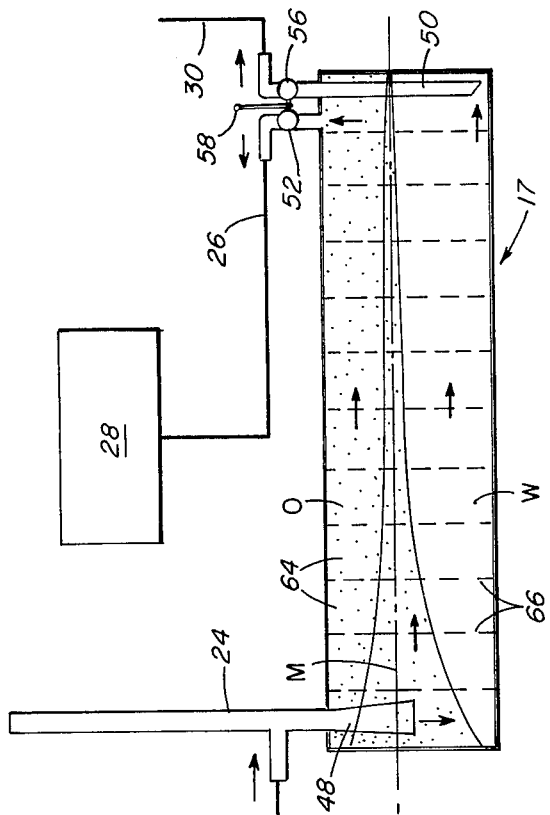
FIG. 2 is a diagrammatic view of the separator, showing its flow path unfolded.

The flow path has been unfolded in the diagrammatic view shown in FIG. 2. The eleven baffles 66 divide the path into twelve compartments. Flow through the separator is in three phases. A mixture M of oil and water enters from conical element 48, and is gradually separated by gravity into an upper oil phase O and lower water phase W.

Figure 7:
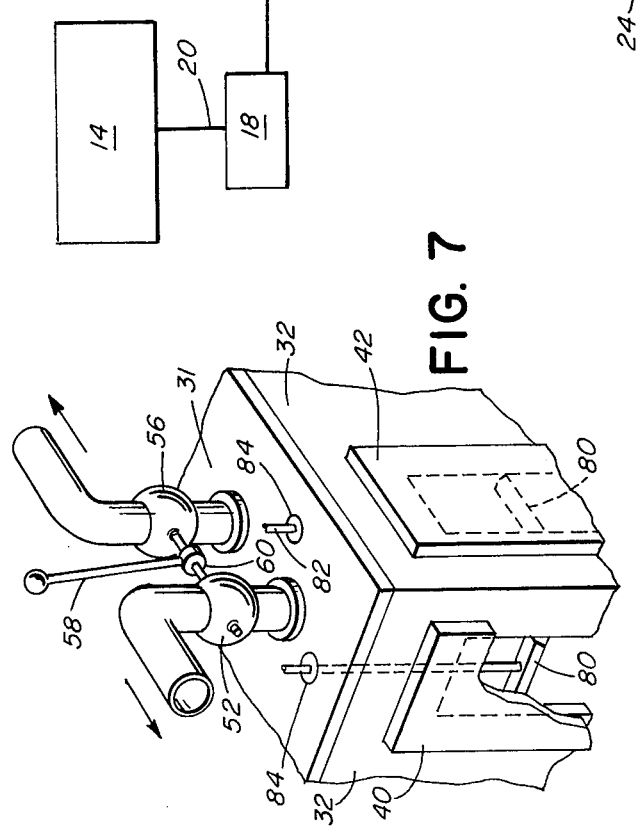
FIG. 7 is an enlarged perspective view of the flow control valves and view windows.

To keep windows 40, 42 clean of oil, wiper elements 80 are provided on reciprocable arms 82 extending downward through glands 84 in top plate 31 (FIG. 7).

The relatively narrow lateral width of the flow path (11.7 inches) as compared to its height (about 42 inches) and the close spacing of the perforate baffles 66 (about 12 inches) help to reduce sloshing or wave motion, particularly at the oil-water interface, and to even the flow velocity, thereby minimizing the possibility of high-speed flow paths that would reduce residence time and thereby make separation less effective.

Conical element 48 and standpipe 24 provide for separation of entrained air prior to entry to the separator. Standpipe 24 forms a hydrostatic leg with sufficient height to accomodate the pressure head provided by pump 20, and is transparent to allow operator control in an unusual surge situation. Downward widening of the inlet flow path afforded by the conical element has the effect of increasing the residence time of the mixture below the standpipe, thereby allowing greater time for air bubbles to rise and escape through the top opening of the standpipe. This slowing action of the conical element is illustrated by the velocity vectors in FIG. 5. At the top of the conical element, the downward mixture velocity $V_M$ is nearly as great as the upward buoyancy velocity of the air $V_A$. The net upward velocity of the air $V_N$ ($V_N = V_A - V_M$) is quite small. At the wider bottom of the conical element, the mixture velocity $V_M$ is much smaller, while the relative velocity of the air $V_A$ is the same, thereby making the net upward velocity of the air $V_N$ greater. Furthermore, the reduction in mixture speed causes less downward drag on the bubbles, making the air velocity due to buoyancy greater at the base of the cone. This permits accumulation of air in larger bubbles above the base of the cone, and as the larger bubbles have a faster rise velocity they are able to move up through the inlet T-fitting and out the standpipe. The standpipe also provides protection against overpressurization of the separator and the oil storage bag.

Debris, e.g., ice chunks, entering through the inlet (or formed inside by freezing) is passed along the flow path through apertures 69 in baffles 66 and, particularly for floating debris, through gaps 70 between top plate 31 and the baffles 66. The size of these openings is sufficient to pass any debris entering through inlet hoses 20, 22, standpipe 24, and conical element 48, all of which have 3 inch or greater internal diameters. Apertures 69 are also 3 inches in diameter and gap 70, though 3 inches high, is augmented in size at its center by a half aperture 71.

The folded, serpentine flow path provides about 6 minutes residence time at a nominal flow rate of 60 gal/min, as the tank has a 350 gallon volume.

This is sufficient to achieve better than 99% separation of oil from water. Stability of the supporting vehicle (here, a boat) is enhanced by the low height made possible in part by the long residence time and is also enhanced by the longitudinal and lateral bulkheads and baffles that minimize sloshing, which tends to cause detrimental shifts in the liquid center of gravity even with the tank full due to the difference in density of the separated phases.

Other embodiments of the invention will occur to those skilled in the art.

What is claimed is:

1. A separator for separating oil from water at the scene of an oil spill, comprising;
   a tank with a top and bottom,
   said tank being sealed for pressurized flow therethrough,
   at least one upright, imperforate bulkhead extending from top to bottom of said tank and dividing said tank into a folded, horizontal flow path, said bulkhead preventing cross communication between upstream and downstream portions of the folded flow path, inlet means at one end of said path for receiving a pressurized mixture including oil, water, and debris, said inlet means having an inlet diameter that establishes a maximum-size debris that can enter said tank, oil outlet means at the other end of said path for permitting outflow of oil from the top of said tank, water outlet means at the other end of said path for permitting outflow of water from the bottom of said tank, valve means for adjusting the relative proportion of water and oil outflowing from said tank through said outlet means, thereby allowing the heights of separated oil and water at said other end to be maintained constant, indicating means for providing an indication to an operator of said heights of separated oil and water, and a plurality of horizontally-spaced, upright perforate baffles extending across said flow path and dividing said path into a plurality of compartments bounded in the vertical direction by said top and bottom and bounded in the horizontal direction by said bulkhead and baffles, said compartments being adapted to provide unimpeded vertical movement of separating oil and water, said perforate baffles having perforations preselected in size to pass said maximum-size debris entering through said inlet means while also evening out differences in flow velocity across said flow path and damping sloshing and wave motion of the oil and water, including interfacial waves at the interface between the oil and water, said tank, said upright bulkhead, said perforate cross baffles, and vertically-unimpeded compartments enabling an inclined oil-water separating interface to be established over the length of said flow path as separating water progressively settles and separating oil progressively rises while the pressurized total flow proceeds toward the respective oil and water outlet means at the downstream end of said path.

2. The separator of claim 1 wherein said perforate baffles are spaced vertically below said top of said tank, to provide a gap for passing said debris floating on said oil.

3. The separator of claim 1 wherein the vertical dimension of the vertical cross section of said flow path is more than twice the horizontal dimension.

4. The separator of claim 3 where the ratio of said vertical to said horizontal dimension is between 3 and 4.

5. The separator of claim 1 wherein there are at least two of said bulkheads and said flow path is folded at least twice to make it serpentine.

6. The separator of claim 5 wherein said tank has a rectangular horizontal cross section and said imperforate bulkheads run parallel to two sides of said tank and some of said perforate baffles run parallel to the other two sides of said tank.

7. The separator of claim 5 wherein
there are two said bulkheads, one extending from a first side of said tank part way to a second side opposite the first and the other of said bulkheads extending from the second side part way to the first side, one of said perforate baffles fills the gap between the end of each said bulkhead and the adjoining side of said tank, and the remaining perforate baffles extend perpendicular to said bulkheads, the spacing between bulkheads and baffles being selected to divide said tank into compartments of about equal size.

8. A separator for separating oil from water at the scene of an oil spill, comprising;

a tank with a top and bottom, said tank being sealed for pressurized flow therethrough, inlet means at one end of said tank for receiving a pressurized mixture including oil, water, and debris, said inlet means having an inlet diameter that establishes a maximum-size debris that can enter said tank, oil outlet means at the other end of said tank for permitting outflow of oil from the top of said tank, water outlet means at the other end of said tank for permitting outflow of water from the bottom of said tank, valve means for adjusting the relative proportion of water and oil outflowing from said tank through said outlet means, thereby allowing the heights of separated oil and water at said other end to be maintained constant, indicating means for providing an indication to an operator of said heights of separated oil and water, and a plurality of horizontally-spaced, upright perforate baffles extending across said flow path and dividing said path into a plurality of compartments, said compartments being bounded in the vertical direction by said top and bottom and bounded in the horizontal direction by said baffles, said compartments being adapted to provide unimpeded vertical movement of separating oil and water, said perforate baffles having perforations preselected in size to pass said maximum-size debris entering through said inlet means while also evening out differences in flow velocity across said flow path and damping sloshing and wave motion of the oil and water, including interfacial waves at the interface between the oil and water, all of said perforate baffles stopping short of said top to provide a gap between said top and the upper end of each said baffle, so as to provide an unimpeded horizontal path above said baffles, from said inlet to said oil outlet, for passing floating debris, and said tank, said perforate cross baffles, and said vertically-unimpeded compartments enabling an inclined oil-water separating interface to be established over the length of said flow path as separating water progressively settles and separating oil progressively rises while the pressurized total flow proceeds toward the respective oil and water outlet means at the downstream end of said path.

* * * * *